United States Patent [19]

Field et al.

[11] 4,139,156
[45] Feb. 13, 1979

[54] RECIRCULATING SPRAYER

[75] Inventors: David D. Field; Bill R. Porter; George D. Porter, all of Lubbock, Tex.

[73] Assignee: Porter Manufacturing Corporation, Lubbock, Tex.

[21] Appl. No.: 790,434

[22] Filed: Apr. 25, 1977

[51] Int. Cl.² .......................................... B05B 11/10
[52] U.S. Cl. ................................... 239/121; 239/124
[58] Field of Search ............... 239/120, 121, 124, 126, 239/127, 148

[56] References Cited

U.S. PATENT DOCUMENTS

| | | | |
|---|---|---|---|
| 1,416,065 | 5/1922 | Rhodes | 239/121 |
| 2,529,530 | 11/1950 | Abildgaard et al. | 239/127 X |
| 2,763,575 | 9/1956 | Bede | 239/124 X |
| 3,584,787 | 6/1971 | Thomason | 239/121 |

*Primary Examiner*—Robert W. Saifer
*Attorney, Agent, or Firm*—Wendell Coffee

[57] ABSTRACT

Spray nozzles are aimed at openings in the side of capture chambers. Fluid is pumped directly from sumps within the capture chambers through the spray nozzles and into the capture chamber openings. Vegetation passing between the nozzles and the capture chambers is sprayed, and any fluid not intercepted by vegetation is returned to the sumps after entering the capture chamber openings. The fluid level in each sump is regulated by a float valve which interrupts a flow of fluid fed by gravity from a supply tank.

2 Claims, 1 Drawing Figure

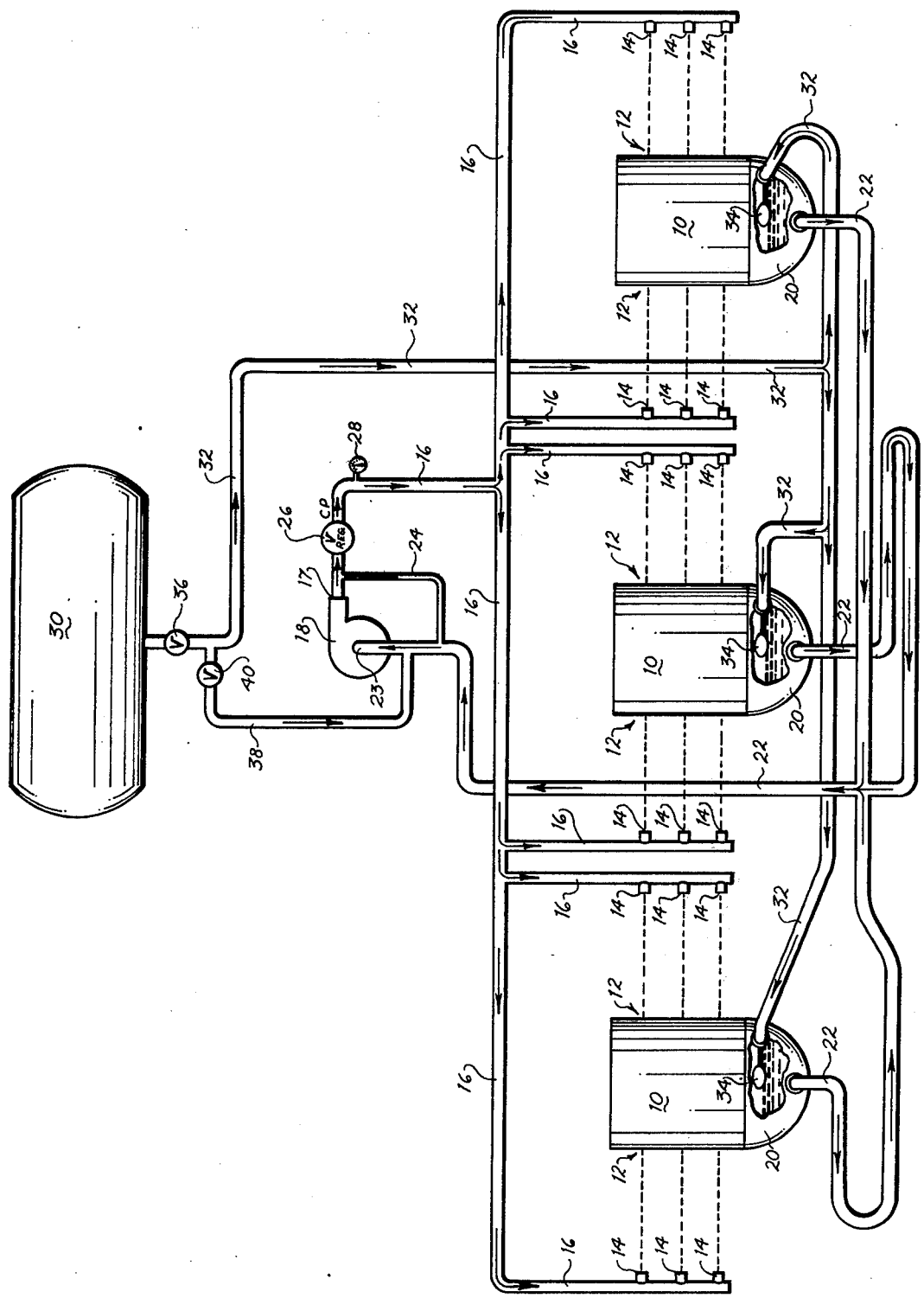

RECIRCULATING SPRAYER

BACKGROUND OF THE INVENTION (1) Field of the Invention

This invention relates to agricultural sprayers, and more particularly to such sprayers that capture and recirculate unused spray fluid.

(2) Description of the Prior Art

Weeds are a problem in cultivated crops, especially when the weeds are interspersed with the cultivated plants.

Workers in the art have employed various methods of eliminating post-emergent weeds, e.g., hoeing or pulling by manual labor, manually spraying herbicides, or spraying the entire crop with herbicides from conventional spraying equipment. However, such methods are costly because of labor expenses or wasted fluid or because of damage to the cultivated plants.

One solution of these problems is embodied in THE RECOVERY SPRAYER, manufactured by Riverside Chemical Company, a subsidiary of Cook Industries, Memphis, Tenn. This equipment sprays the herbicide horizontally through spray nozzles aligned with an opening in a capture chamber. The fluid streams are positioned above the tops of the cultivated plants. Any weeds of greater height than the crop intercept the streams and are sprayed. Fluid not so intercepted enters the capture chamber opening, and is captured and returned to a sump at the bottom of the capture chamber. The fluid in the sump is returned to the main supply tank by an injector. The fluid discharge of a pump is divided, one stream which powers the injector and another stream which flows to the spray nozzles.

The prior art uses a "double loop" or divided flow system with the supply of fluid being within the main flow and loop. The fluid which has been sprayed is returned to the supply of fluid, thus contaminating the fresh supply of fluid in the supply tank with impurities contracted by the fluid during the spraying process, e.g., dust, bugs and pollen.

Also, the device requires two means of pumping fluid, one to pump fluid from the supply tank and another to move fluid from the sump back to the supply tank. As previously described, the injector is used to move the fluid from the sump. Basically, injectors are inefficient fluid movers and this injector is powered by the spray pump which necessitates a large pump. When the sump is sucked dry, air is sucked into the fluid lines, causing chemical "foaming".

SUMMARY OF THE INVENTION (1) New and Different Function

We have solved the problems associated with recapture sprayers by inventing a recirculating sprayer which employs a single loop or flow, with the supply of fresh fluid being outside of and independent of the loop. Our invention is also more efficient and simpler to operate and understand.

In our invention, fluid streams from nozzles are directed just above the cultivated plants, and weeds taller than the plants or crop are sprayed as the sprayer is moved through the field. The fluid is sprayed into an opening in the side of a capture chamber. The fluid captured is drained into a sump at the bottom of the chamber.

The suction connection of the pump is connected directly with the sump. The recirculation is only from the sump to the pump through the spray nozzles into the capture chamber and back to the sump. The sump is gravity fed with clean fluid from the supply tank through a float valve. Since the sumps are not sucked dry, there is no foaming problem. Operation fluid never flows into the supply tank, only from it.

Therefore, we have solved the problem of contaminating the fresh initial supply source with dirty sprayed and recirculated fluid by removing the supply tank from the closed loop and only removing fluid from supply when needed. Much of the herbicide used in agriculture is damaged by impurities. The herbicide is absorbed by the impurities, thus reducing the effectiveness of the herbicide solution. Some commercially popular herbicides are extremely sensitive to contamination. Hence, our invention allows storage of herbicides in the supply tank because the fluid within the supply tank remains uncontaminated.

The pump on our device needs only to provide fluid to the nozzles, resulting in greater efficiency and allowing the use of small capacity pumps which are widely used by and commonly available to farmers.

With our invention, as the farmer nears the end of the spraying operation, he closes a valve in the line feeding the sump, thereby isolating the fresh supply from the spray system. This allows the sprayer to use up the dirty fluid already in the sump and thereby draining the system while spraying. In addition, once the fluid level in the sump is lowered below the suction connection of the sump, the pump will pump itself empty and will be ready for flushing.

To flush, the sumps are filled with wash water after closing the sump supply line. Operation of the pump flushes the system, maintaining the clean herbicide within the supply tank. Drains at the bottom of the sump are provided.

Therefore, it may be seen that our invention solves many problems associated with the prior art in a completely new and different way; thus the function of the system is greater than the sum of the functions of the individual valves, nozzles, pump, and other elements.

(2) Objects of the Invention

An object of this invention is to spray herbicide on weeds.

Another object is to accomplish the above while capturing and recirculating herbicide not sprayed on weeds.

Further objects are to achieve the above with a device that is sturdy, compact, durable, lightweight, simple, safe, efficient, versatile, ecologically compatible, energy conserving, and reliable, yet inexpensive and easy to manufacture, install, adjust, operate and maintain.

Other objects are to achieve the above with a method that is versatile, ecologically compatible, energy conserving, rapid, efficient, and inexpensive, and does not require skilled people to install, adjust, operate, and maintain.

The specific nature of the invention, as well as other objects, uses, and advantages thereof, will clearly appear from the following description and from the accompanying drawing.

BRIEF DESCRIPTION OF THE DRAWING

The drawing shows a schematic representation of an embodiment of our invention.

DESCRIPTION OF THE PREFERRED EMBODIMENT

Capture chambers 10 are attached to a frame (not shown for clarity) and have capture chamber openings 12 in their sides. Spray nozzles 14 spray horizontally and are aligned with the capture chamber openings 12. The spray nozzles 14 are in headers connected to pressure line 16 which is connected to pressure connection 17 of pump 18.

The arrows on the drawing indicate the direction of fluid flow through the various lines. The dotted lines between the capture chambers 10 and the spray nozzles 14 illustrate the part of the sprayed fluid from the nozzles to the capture chambers.

Sumps 20 are located within and connected to the capture chambers 10 at their lowermost point. Any fluid sprayed from the spray nozzles 14 into the capture chambers 10 will drain and be collected in the sumps 20. Suction line 22 is connected to the lower part of the sumps 20 and extends to suction connection 23 of the pump 18.

Bypass line 24 connects the suction line 22 with the pressure line 16 at control valve 26. The bypass line 24 has a small bore or diameter so that only a small amount of fluid flows through it. Pressure gauge 28 is located in the pressure line 16 at a point downstream from the control valve 26. The control valve 26 allows regulation of and the pressure gauge 28 allows monitoring of the fluid pressure to the spray nozzles 14.

Supply tank 30 is above the sumps 20, and is connected to the sumps 20 by sump supply lines 32. Floats 34 are located within the sumps 20 and are connected to the sump supply lines 32. The floats 34 regulate the fluid level within the sumps 20 by interrupting the fluid flow from the supply tank 30 when the fluid level within the sumps 20 reaches a predetermined level. The fluid level of each sump 20 is independently controlled. The fluid flows by gravity from the supply tank 30 to the sumps 20.

Shutoff valve 36 is located in the sump supply line 32 near tank 30 and permits the fluid flow to be shut off. Priming line 38 connects the sump supply line 32 with the suction connection 23. Normally closed lever valve 40 in the priming line 38 permits the pump 18 to be primed.

We prefer to employ a centrifugal pump which requires priming because such pumps are widely used by farmers for other purposes, thereby making in-the-field repair and replacement of the sprayer easier. Float valves are commonly in use on a farm, thereby simplifying sump level control maintenance and in-the-field repair.

The length of the suction lines 22 from each sump 20 should be nearly equal. Otherwise, large disparate withdrawal rates among the sumps 20 will result in an overflow of one of them. Corrosion resistant flexible hoses are preferred for the lines for durability and easy replacement of lines or other elements of the sprayer.

The initial procedure for starting the sprayer may be as follows: The shutoff valve 36 and the lever valve 40 are opened, allowing the sumps to fill and the pump to be primed. The sprayer may be started before spraying operations commence because there is nothing to interrupt the spray before it reaches the capture chamber. The pump is then started and the pressure gauge checked to insure that adequate pressure is present in the pressure line to cause the fluid sprayed from the nozzles 14 to enter the capture chamber openings 12. The sprayer is vertically positioned by raising or lowering the frame so that the spray from the nozzles 14 is just above the tops of the cultivated plants during spraying operations.

While spraying, the pump 18 pumps fluid from the sump 20 through the control valve 26 (excess pressure being relieved by the small diameter bypass line 24) and then through the spray nozzles 14. The fluid leaving the spray nozzles 14 is either intercepted by vegetation or enters the capture chamber 10 through the capture chamber opening 12. The fluid is then drained into the sump 20 where it is ready to be pumped through the nozzles again. Any spray which is used by spraying vegetation is replenished from the supply tank.

Shortly before spraying operations are completed, the shutoff valve 36 is closed, thereby using most of the fluid in the sumps 20. When the spraying is interupted, e.g., at the end of the day, the system can be flushed by the procedure outlined in the summary above.

The embodiment shown and described above is only exemplary. We do not claim to have invented all the parts, elements or steps described. Various modifications can be made in the construction, material, arrangement, and operation, and still be within the scope of our invention. The limits of the invention and the bounds of the patent protection are measured by and defined in the following claims. The restrictive description and drawing of the specific example above do not point out what an infringement of this patent would be, but are to enable the reader to make and use the invention.

As an aid to correlating the terms of the claims to the exemplary drawing, the following catalog of elements is provided:

10 capture chamber
12 capture chamber openings
14 spray nozzles
16 pressure line
17 pressure connection
18 pump
20 sump
22 suction line
23 suction connection
24 bypass line
26 control valve
28 pressure gauge
30 supply tank
32 sump supply line
34 float
36 shutoff valve
38 priming line
40 lever valve

We claim as our invention:

1. In a fluid retrieval sprayer having
    a. a supply tank,
    b. a pump having
        (i) a suction connection and
        (ii) a pressure connection,
    c. a plurality of nozzles,
    d. a pressure line connecting the pressure connection of said pump to said nozzles,
    e. a plurality of fluid capture chambers providing means for capturing a stream of fluid from the nozzles, and
    f. each fluid capture chamber having a fluid sump fluidly connected to the tank;
the improved recirculating structure comprising in combination with the above:

g. suction lines connecting the suction connection of the pump to each of said sumps so that the sole operating source of fluid for the pump is the sumps, h. each of said suction lines being equal in length so that the withdrawal rate among the sumps is not largely disparate, j. a sump supply line connecting said supply tank to each of said sumps, k. sump level means connected to each of said supply lines for regulating the fluid level within each of the sumps, m. pressure control means in the pressure line for controlling the fluid pressure at the nozzles, and n. a by-pass conduit from the pressure control means to the suction line, o. said supply tank elevated above said sumps and the fluid feeds from the supply tank is by gravity.

2. The invention as defined in claim 1 further comprising:

p. a priming line connecting from said sump supply lines to the suction connection of the pump, and q. a lever valve in said priming line so that the pump may be primed upon starting operations.

* * * * *